United States Patent
An et al.

(10) Patent No.: US 9,237,041 B1
(45) Date of Patent: Jan. 12, 2016

(54) DATA RECEPTION WITH FEEDBACK EQUALIZATION FOR HIGH AND LOW DATA RATES

(71) Applicant: Xilinx, Inc., San Jose, CA (US)

(72) Inventors: Fu-Tai An, San Jose, CA (US); Didem Z. Turker Melek, Campbell, CA (US); Yuan-Shih Chen, Cupertino, CA (US)

(73) Assignee: XILINX, INC., San Jose, CA (US)

(*) Notice: Subject to any disclaimer, the term of this patent is extended or adjusted under 35 U.S.C. 154(b) by 0 days.

(21) Appl. No.: 14/601,587

(22) Filed: Jan. 21, 2015

(51) Int. Cl.
| | |
|---|---|
| *H04L 27/18* | (2006.01) |
| *H04L 25/03* | (2006.01) |
| *H04L 7/00* | (2006.01) |
| *H04L 1/00* | (2006.01) |
| *H04L 25/02* | (2006.01) |

(52) U.S. Cl.
CPC ........ *H04L 25/03057* (2013.01); *H04L 7/0025* (2013.01); *H04L 1/0002* (2013.01); *H04L 7/0058* (2013.01); *H04L 25/0292* (2013.01); *H04L 25/03146* (2013.01); *H04L 2025/0349* (2013.01)

(58) Field of Classification Search
CPC ................. H04L 25/03057; H04L 2025/0349; H04L 7/0058; H04L 1/0002; H04L 25/0292; H04L 25/03146
USPC .................. 375/233, 350, 229, 316, 232, 348
See application file for complete search history.

(56) References Cited

U.S. PATENT DOCUMENTS

| | | | |
|---|---|---|---|
| 7,443,913 B2 * | 10/2008 | Bhakta et al. ................. 375/233 |
| 2013/0028313 A1 * | 1/2013 | Shen et al. .................... 375/233 |
| 2013/0243127 A1 * | 9/2013 | Chmelar et al. .............. 375/316 |
| 2013/0342240 A1 * | 12/2013 | Amirkhany et al. ........... 327/50 |

* cited by examiner

*Primary Examiner* — Leila Malek
(74) *Attorney, Agent, or Firm* — W. Eric Webostad

(57) ABSTRACT

A method relates generally to data reception for any of a plurality of data rates. In such a method, information and phases of a clock signal are obtained by a decision feedback equalizer. The information is equalized using the phases of the clock signal with the decision feedback equalizer to provide equalized sample streams. The equalized sample streams and the phases of the clock signal are provided to a selection circuit block. A first and a second phase of the phases are swapped, along with swapping a first and a second equalized sample stream corresponding to the first phase and the second phase, responsive to a data rate of the plurality of data rates.

20 Claims, 6 Drawing Sheets

DATA RECEPTION WITH FEEDBACK EQUALIZATION FOR HIGH AND LOW DATA RATES

TECHNICAL FIELD

The following description relates to integrated circuit devices ("ICs"). More particularly, the following description relates to data reception with feedback equalization for high and low data rates for an IC.

BACKGROUND

Decision Feedback Equalization ("DFE") may be used to combat inter-symbol interference ("ISI"). DFE circuitry may thus be used in high speed serial links to improve bit error rate ("BER"), such as in a receiver of a serializer-deserializer ("SERDES") for example. However, because of delay due to feedback in DFE, this delay may limit frequency of operation of a receiver. Therefore, adding any additional delay in a DFE path may further limit performance. For a wide-band serial link, this timing problem in DFE circuitry may be exacerbated due to a "set-up time" parameter for a high or the highest data rate that may not simultaneously satisfy a "hold-time" parameter for a low or the lowest data rate.

Accordingly, it would be desirable and useful to provide a receiver with DFE that may be used for both high and low data rates which overcomes the above-described limitation without having to introduce additional delay in a DFE path.

SUMMARY

A method relates generally to data reception for any of a plurality of data rates. In such a method, information and phases of a clock signal are obtained by a decision feedback equalizer. The information is equalized using the phases of the clock signal with the decision feedback equalizer to provide equalized sample streams. The equalized sample streams and the phases of the clock signal are provided to a selection circuit block. A first and a second phase of the phases are swapped along with swapping a first and a second equalized sample stream corresponding to the first phase and the second phase are swapped responsive to a data rate of the plurality of data rates.

An apparatus relates generally to data reception for any of a plurality of data rates. In such an apparatus, a selection circuit block is coupled to receive equalized sample streams and associated clock signal phases. The selection circuit block is coupled for swapping a first and a second phase of the clock signal phases and for swapping a first and a second equalized sample stream of the equalized sample streams responsive to a data rate of the plurality of data rates.

A system relates generally to data reception at any of a plurality of data rates. In such a system, there is a decision feedback equalizer. A selection circuit block is coupled for receiving equalized sample streams from the decision feedback equalizer and coupled for receiving associated clock signal phases corresponding to the equalized sample streams. The selection circuit block is coupled for swapping: a first and a second phase of the clock signal phases responsive to a data rate of the plurality of data rates; and a first and a second equalized sample stream of the equalized sample streams corresponding to the first phase and the second phase responsive to the data rate of the plurality of data rates. A serial-to-parallel converter is coupled for receiving the equalized sample streams and the clock signal phases delayed from the selection circuit block to provide a digital parallel data steam.

A phase interpolator block is coupled for providing the clock signal phases with the first phase and the second phase swapped to the decision feedback equalizer.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

Generally, receivers with DFE are configured for high-speed operation, namely for high data rates. This has generally meant obtaining a crossing sample after a data sample for such high data rates to provide extra timing margin. Unfortunately, when operating at low data rates, this sampling of a crossing after sampling of data may be too late for such receivers configured for high-speed operation, and thus may corrupt such crossing samples at low data rates, where an earlier sampling of a crossing sample may have been used instead as described below in additional detail. Rather than having multiple receiver configurations, a receiver with DFE that is capable of operating at high and low data rates is proposed.

Described below in additional detail is a receiver configured with DFE that switches phases of a clock signal depending on whether a data rate is above or below a threshold level. This threshold level may be determined as to when sampling a crossing after sampling of data is too late, and thus data rate is too low for such sampling. For this condition, phases of a clock signal may be switched for an earlier sampling of a crossing. A circuit topology described below in additional detail may be used for wide band serial links to meet the timing constraints for various data rates when DFE and Alexander-type clock data recovery ("CDR") are used. This circuit topology may have no impact on a DFE feedback timing path. Because such DFE feedback timing path may be limiting with respect to high-frequency operation, this addition of low data rate capability may not adversely affect performance.

With the above general understanding borne in mind, various configurations for data reception with equalization for high and low data rates are generally described below. Even though the following description is in terms of DFE, the following description is applicable more generally to equalization involving feedback of information.

Figure 1:
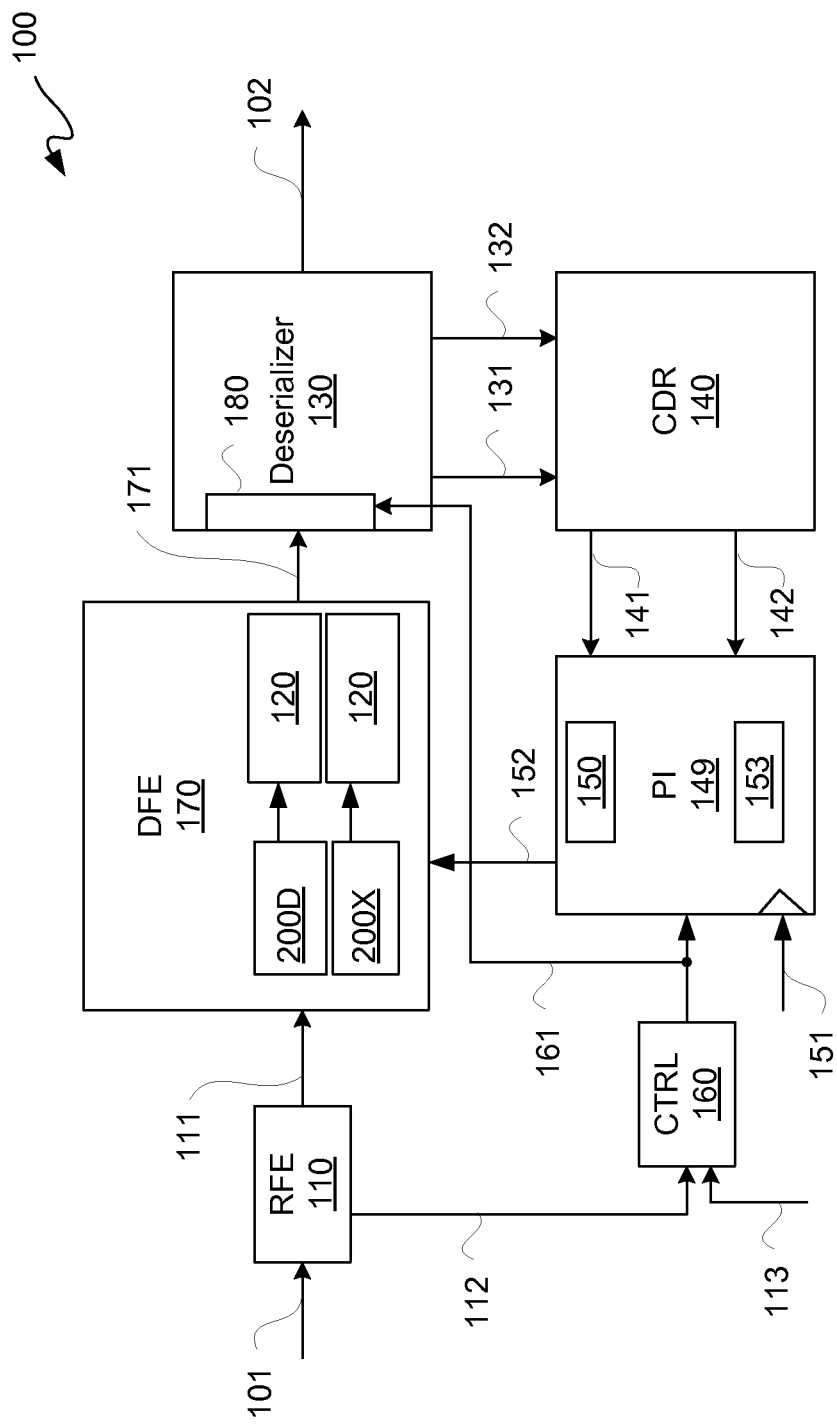
FIG. 1 is a block diagram depicting an exemplary receiver system ("receiver") for data reception.

FIG. 1 is a block diagram depicting an exemplary receiver system ("receiver") 100 for data reception. Receiver 100 may be of a SERDES for receiving transmitted serial data 101 for conversion to a digital parallel data stream 102.

Receiver 100 may be for data reception at any of a plurality of data rates. Such data rates may be set by one or more communication protocols, as is known. Accordingly, a data rate signal ("data rate") 112 may be for any of such plurality of data rates within an operational range of receiver 100.

Receiver 100 may include: a receiver front end ("RFE") or analog front end ("AFE") 110; a data converter, such as a decision feedback equalizer ("DFE") 170 which may include one or more slicer blocks ("slicers") 200 and one or more DFE circuitry blocks 120; a serial-to-parallel converter, such as a demultiplexer or deserializer 130; a clock data recovery block ("CDR") 140; a multiple-phase clock source, such as a phase interpolator block ("PI") 149; an optional control circuitry block ("control circuitry") 160; and a selection circuit block 180. PI 149 may include one or more phase interpolators ("PIs") 150 and/or dividers 153, as is known.

DFE 170 may include slicers 200D and 200X. A slicer may be thought of as a latch, and a slicer may be referred to as a "CapFF" referring to a capture flip-flop. A slicer may be used to perform the sampling of analog data, and so a slicer provides an analog-to digital-conversion by this sampling. DFE 170 may include latches in a forward path, as well as feedback path, as generally depicted as DFE circuitry blocks 120. In this example, there are separate data slicers 200D and 200X in DFE 170, where each of data slicers 200 may be coupled to a respective DFE circuitry block 120 of DFE 170.

Selection circuit block 180 may be a separate block coupled between output of DFE 170 and input of deserializer 130, or selection circuit block 180 may be incorporated into deserializer 130, as illustratively depicted in FIG. 1. Moreover, optional control circuitry 160 may optionally be incorporated in selection circuit block 180 or may be a separate block, as illustratively depicted in FIG. 1. As shall be understood from the following description, addition of selection circuit block 180, as well as control circuitry 160, is a small amount of circuitry overhead.

Apart from addition of selection circuit block 180 as described herein, as well as optional control circuitry 160, receiver 100 may be known. Accordingly, known blocks of receiver 100 are not described in unnecessary detail for purposes of clarity.

RFE 110 may be coupled to receive transmitted data 101 and may be coupled to provide an analog data stream 111 as an input to DFE 170. DFE 170 may provide digital data streams as part of data slicers/DFE circuitry blocks output ("digital data output") 171. For purposes of clarity by way of example and not limitation, it shall be assumed that DFE 170 is configured to provide even data samples ("even D"), odd data samples ("odd D"), even crossing samples ("even X"), and odd crossing samples ("odd X") as part of digital data output 171. Again, it should be understood that DFE 170 may include more than one data slicer. In this example, there is a data slicer 200D and a crossing slicer 200X in DFE 170, and each of data slicer 200D and crossing slicer 200X may be coupled to DFE circuitry blocks 120 for forward and feedback path latching.

Additionally, digital data output 171 may include corresponding phases of an input clock signal associated with such odd and even X and D samples, as described below in additional detail. PI 150 may provide clock signaling respectively associated with odd and even X and D samples, namely a clock even D, a clock odd D, a clock even X, and a clock odd X as clock signals 152. Clock signals 152 may be for respective phases of a clock signal. For example, a reference clock signal 151 may be input to PI 150, and PI 150 may provide four separate phases of such reference clock signal 151 or four separate phases of a phase and/or frequency adjusted version of such reference clock signal 151.

For purposes of clarity, clock signals 152 may be referred to as input clock signal 152, and clock signals 152 may be four separate phases of a clock signal. Clock signals 152 may be provided to DFE 170, and in DFE 170, such clock signals may be provided to data slicers 200X and 200D, as well as feedback path latches and forward path latches of DFE circuitry blocks 120. An allowable delay for equalization, such as by DFE 170, of a digital data stream output by from DFE 170 may be constrained by a frequency of input clock signal 152, and so having odd and even samples may lessen a burden of a time constraint by allowing for processing halves of such digital data stream in parallel to meet such constraint.

Even though even and odd samples for data and crossings are described herein, in other configurations data need not be parsed out into even and odd samples, but rather just data and crossing samples, such as for operation at one unit interval ("UI"). However, to relax timing margin, even and odd samples of data and crossings may be used, such as for operation at two unit intervals ("UIs"). Use of odd and even samples may provide additional time for DFE so as to avoid having to reduce performance to meet a timing constraint.

As is known, a UI is one divided by a data rate. Again, such a data rate may vary from application-to-application, and thus a UI may correspondingly vary. In this example, RFE 110 provides a data rate 112 associated with transmitted serial data 101 to control circuitry 160. Control circuitry 160 may be configured to compare such data rate 112 with a threshold value 113. An equalization path delay may be set to be equal to or less than 2 UI for DFE. This condition may be used to determine a highest data rate for operation. In determining a select signal 161 by control circuitry 160 for early crossings, a threshold value 113 may be determined as described below. In a first implementation, if it is determined that equalization can be performed at 1.5 UI or less, then an early crossing can be sampled, namely sampling crossings before sampling associated data for determining a threshold value 113. In a second implementation, if equalization path is faster than 0.5 UI, then crossings may be sampled earlier than data for another threshold value 113. A threshold value 113 in the first implementation may be for a higher data rate than in the second implementation. For data rates between these two thresholds, both early crossings and late crossings may be used. Accordingly, there may be many data rates where both sampling early and late of crossings may be used.

In this example, for data rate 112 being below threshold value 113, equalization by DFE 170 may be performed at approximately 1.5 UIs, and for data rate 112 being above threshold value 113, equalization by DFE 170 may be performed at approximately 2.0 UIs. However, in other configurations, other values of UIs may be used. Furthermore, in a Field Programmable Gate Array ("FPGA") or other IC implementation, a user may set state of select signal 161 for a data rate of an application thereby bypassing control circuitry 160. However, for purposes of clarity by way of example and not limitation, it shall be assumed that control circuitry 160 is not bypassed.

Selection circuit block 180 may be coupled to receive digital data output 171 from DFE 170 to receive digital data streams and associated phases of input clock signal 152. Selection circuit block 180 may swap a first phase of input clock signal 152 with a second phase of input clock signal 152 different therefrom of associated phases responsive to assertion of select signal 161, namely for a data rate 112 being below a threshold value 113.

Deserializer 130 may be coupled to receive digital data streams and associated phases of input clock signal 152 to provide a digital parallel data steam 102. Additionally, for Alexander-type CDR for example, deserializer 130 may provide data information 131 and crossing information 132 to CDR 140, such as for example D<n:1> and X<n:1> for n a number of bits, such as 8, 10, 16, 20, or some other number of bits. CDR 140 may use such data information 131 and crossing information 132, such as data bits and crossing bits, to provide a CDR data code 141 and a CDR crossing code 142 respectively therefor to PI 150. PI 150 may be configured to adjust phase and/or frequency of input clock 152 responsive to such CDR data code 141 and/or CDR crossing code 142.

Figure 2:
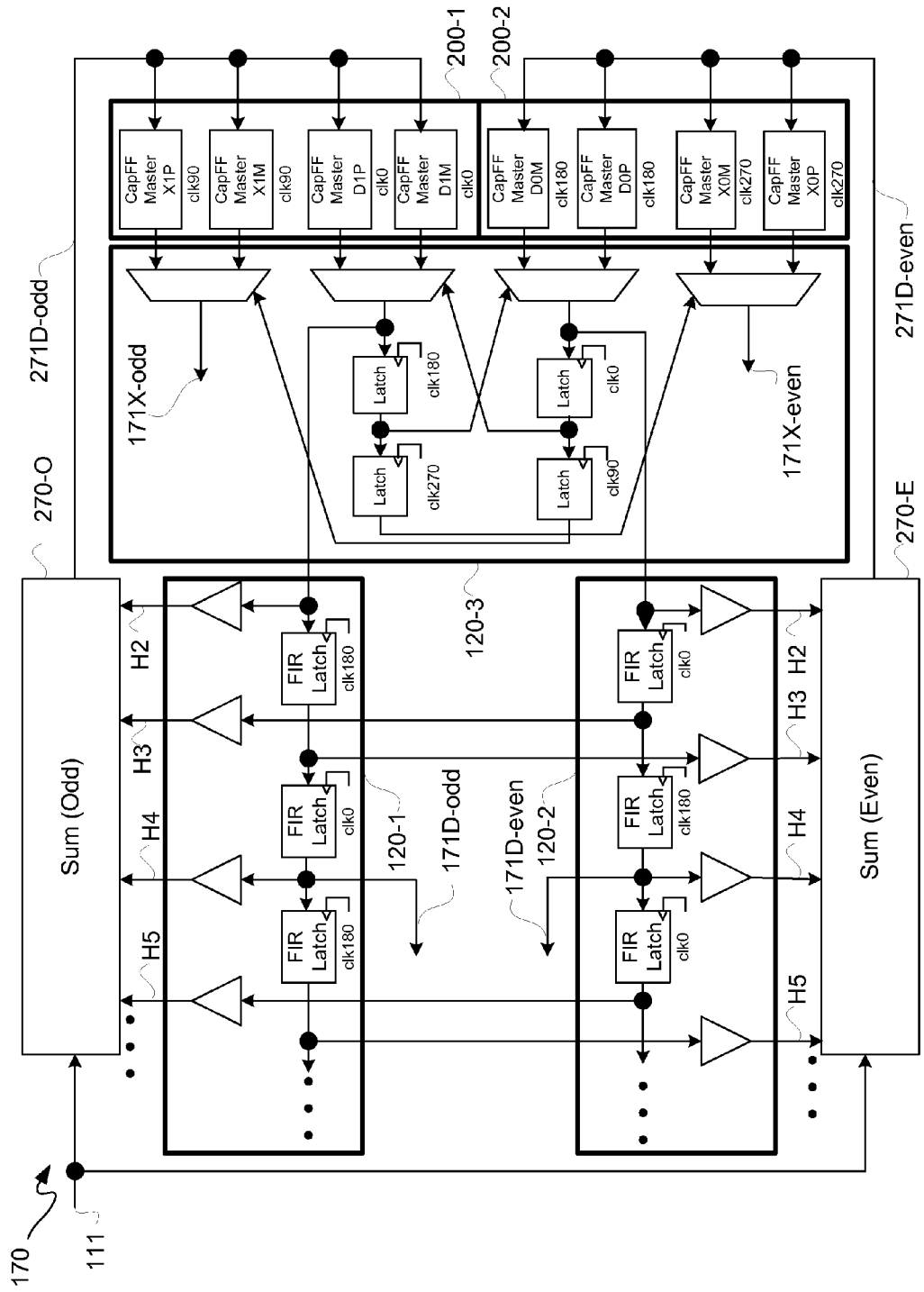
FIG. 2 is a block diagram depicting an exemplary odd-even data slicer with decision feedback equalization circuitry.

FIG. 2 is a block diagram depicting an exemplary odd-even DFE 170. As odd-even DFE 170 is known, it is not described in unnecessary detail for purposes of clarity. Clock signal phases 152, namely four clock phases listed as 0, 90, 180, and 270 degrees, are listed, but signal lines therefor are not illustratively depicted in excessive detail for purposes of clarity and not limitation.

An analog data stream 111 is input to both odd and even DFE summation ("Sum") blocks 270-O and 270-E. An analog output of odd DFE sum block 270-O is an odd data stream 271D-odd, and an analog output of even DFE sum block 270-E is an even data stream 271D-even. Odd data stream 271D-odd and even data stream 271D-even may be respectively provided as forward path inputs to sampling or capture registers of data slicers 200-1 and 200-2, respectively, of such forward path. A portion of each of data slicers 200-1 and 200-2 is for data samples, and another portion of each of data slicers 200-1 and 200-2 is for crossing samples. Accordingly, collectively data slicers 200-1 and 200-2 may be data slicers 200X and 200D of FIG. 1.

In this example, registers of data slicer 200-1 are clocked responsive to phases 0 and 90 of input clock signal 152, and registers of data slicers 200-2 are clocked responsive to phases 180 and 270 of input clock signal 152. For example, digital crossing samples may be obtained with phases 90 and 270, and digital data samples may be obtained with phases 0 and 180. Samples from data slicers 200-1 and 200-2 may be output to selection and cross-coupled circuitry block 120-3 of a DFE circuitry block 120, where odd digital crossing stream 171X-odd and even digital crossing stream 171X-even samples may be respectively sourced from respective outputs of crossing multiplexers. There may be downstream latches coupled to each of crossing multiplexers from which odd digital crossing stream 171X-odd and even digital crossing stream 171X-even samples are sourced, but such downstream latches are not illustratively depicted for purposes of clarity and not limitation.

Additionally, odd and even data samples may be respectively provided from cross-coupled circuitry block 120-3 to finite impulse response ("FIR") filter blocks 120-1 and 120-2 of DFE 170. Alternate taps of each of FIR filter blocks 120-1 and 120-2 may be coupled to corresponding filter coefficients H for DFE feedback inputs to odd DFE sum block 270-0 and even DFE sum block 270-E, where such FIR filter blocks 120-1 and 120-2 are both clocked with phases 0 and 180 of input clock signal 152, but 180 degrees out-of-phase with respect to one another. In this example, all registers may be leading edge clock registers; however, a leading or rising edge of one clock signal may correspond to a lagging of falling edge of another clock signal.

Furthermore, odd digital data stream 171D-odd and even digital data stream 171D-even samples may be respectively sourced from output nodes of FIR filter blocks 120-1 and 120-2, as illustratively depicted. FIR filter blocks 120-1 and 120-2 are part of a feedback path, and feedback digital inputs from FIR filter blocks 120-1 and 120-2 may be converted with D/A converts to provided corresponding analog signals for summation with an analog data stream 111 by sum blocks 270-O and 270-E, though not shown for purposes of clarity and not limitation. In Alexander-type CDR, there may be odd and even sum blocks 270-0 and 270-E for data, where both data (D) samples and crossing (X) samples may be obtained from slicing output sums of sum blocks 270-O and 270-E with data slicer 200D and crossing slicer 200X, with only data samples being fed back to such odd and even sum blocks 270-O and 270-E.

While DFE 170 can significantly improve the quality of a data eye of received data by mitigating ISI, stringent timing may be involved with respect to providing signals from taps of FIR filter blocks 120-1 and 120-2 as feedback inputs to odd and even sum blocks 270-O and 270-E. Timing for signals from such feedback taps to settle may be approximately 2 UIs or less.

By evaluating the "tuplets" composed of pairs data and corresponding crossing samples, a CDR engine, such as CDR block 140, can determine whether to advance or retard phases of input clock signal 152 to place sampling point of data at least near to a center of a data eye to enhance a signal-to-noise ratio ("SNR") and to enhance tolerance to jitter.

In a half-rate Alexander type CDR, slicers are divided into two groups: even and odd. Within each group, crossing (X) samples at the left hand side ("early") of a data eye, or the right hand side of such data eye ("late") may be selected. To meet the timing for the highest and high data rates, the right hand side or late crossing may be chosen or selected. Due to circuit-signal propagation delay, valid feedback information from the previous bit may not be ready until at least almost one UI later for odd and even slicers in the opposite group, either data or crossing. For example, valid data feedback information from a previous bit used for DFE for a crossing may not be ready until at least almost one UI after processing such previous bit. Moreover, such valid feedback information may be deemed effective for a half of a UI or more.

Therefore, for high data rates, a late crossing can benefit from DFE, and thus a crossing area can be denser which leads to better jitter margins. However, at low data rates, a crossing sample ½ UI before a corresponding data sample in each pair may be used.

For example, soon after data is sampled, feedback information may be updated right away. Slicers, presumably, should see such feedback information two taps ago; however, such slicers may incorrectly be affected by feedback information generated by the current tap. In other words, at low data rates, crossing samples may be obtained "too late," such as in a data eye of a corresponding data sample. Therefore, as described herein for low data rates, crossing samples leading corresponding data samples by half a UI are used, and for high data rates, crossing samples lagging corresponding data samples by half a UI are used. In other words, as described herein crossing sampling may be moved to early sampling at low data rates, as corresponding late crossing sampling is "too late", and slicer input data may already have been "modified" by a current tap's feedback information.

Figure 3:
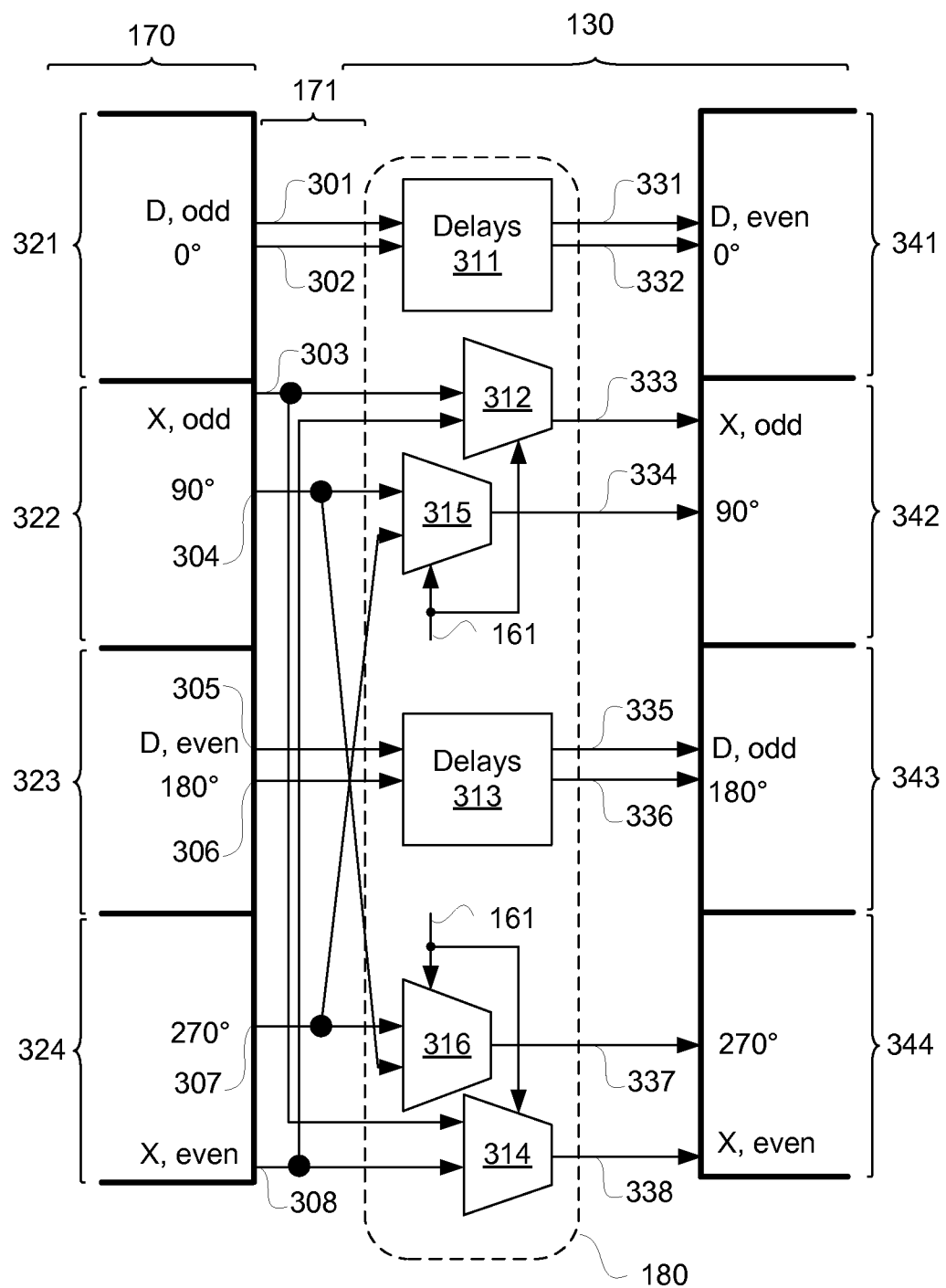
FIG. 3 is a block diagram depicting an exemplary selection circuit block coupled between output ports of the slicer of FIG. 2 and input ports of a deserializer of the receiver of FIG. 1.

FIG. 3 is a block diagram depicting an exemplary selection circuit block 180 coupled between output ports 321-324 of DFE 170 and input ports 341-344 of deserializer 130. Selection circuit block 180 may include delays 311 and 313 and multiplexers 312, 314, 315, and 316.

Generally, ports 321-324 are for pairs of data and corresponding clock signals. Port 321 is for odd data signal 301 and a 0 degree phase clock signal 302 for such odd data signal 301. Port 322 is for odd crossing signal 303 and a 90 degree phase clock signal 304 for such odd crossing signal 303. Port 323 is for even data signal 305 and a 180 degree phase clock signal 306 for such even data signal 305. Port 324 is for even crossing signal 308 and a 270 degree phase clock signal 307 for such even crossing signal 308.

Signals 301 and 302 may be respectively input to delays 311 to respectively provide delayed versions of signals 301 and 302, namely respectively odd data signal 331 and 0 degree phase clock signal 332. Likewise, signals 305 and 306 may be respectively input to delays 313 to respectively provide delayed versions of signals 305 and 306, namely respectively even data signal 335 and 180 degree phase clock signal 336. Delays 311 and 313 may respectively provide a same amount of delay of signals passing through multiplexers 312, 314, 315, or 316, respectively. Accordingly, delays 311 and 313 may be multiplexers, formed just like multiplexers 312, 314, 315, and 316, though with both inputs tied to a common input node and where each is coupled to receive select signal 161 as a control select signal.

A select signal 161 may be a control select signal provided to each of multiplexers 312, 314, 315, and 316 for control of outputs therefrom as described below. Inputs to multiplexer 315 are 90 degree phase clock signal 304 from port 322 and 270 degree phase clock signal 307 from port 324. Inputs to multiplexer 316 are 90 degree phase clock signal 304 from port 322 and 270 degree phase clock signal 307 from port 324. Likewise, inputs to each of multiplexers 312 and 314 are odd crossing signal 303 from port 322 and even crossing signal 308 from port 324.

For a sufficiently high data rate, select signal 161 selects 90 degree phase clock signal 304 as a delayed version thereof as 90 degree phase clock signal 334 for input to a node of port 342. Additionally, for a sufficiently high data rate, select signal 161 selects odd crossing signal 303 as crossing output signal 333 for input to a node of port 342 as odd crossing samples. Likewise, for a sufficiently high data rate, select signal 161 selects 270 degree phase clock signal 307 as a delayed version thereof as 270 degree phase clock signal 337 for input to a node of port 344, and select signal 161 selects even crossing signal 308 as a delayed version thereof as a crossing output signal 337 for input to a node of port 344 as even crossing samples.

Select signal 161 may further be provided to PI block 149. Along those lines, for select signal 161 being asserted, PI 150 may swap clk90 and clk270 phases of input clock signal 152. Multiplexers 315 and 316, as well as multiplexers 312 and 314, may provide another swap to undo such swap by PI 150 so deserializer 130 has correct inputs for 90 and 270 degree phases. For a sufficiently low data rate, select signal 161 selects 270 degree phase clock signal 307 as a delayed version thereof as 90 degree phase clock signal 334 for input to a node of port 342. Additionally, for a sufficiently high data rate, select signal 161 selects even crossing signal 308 as crossing output signal 333 for input to a node of port 342 as odd crossing samples. Likewise, for a sufficiently low data rate, select signal 161 selects 90 degree phase clock signal 304 as a delayed version thereof as 270 degree phase clock signal 337 for input to a node of port 344, and select signal 161 selects odd crossing signal 303 as a delayed version thereof as a crossing output signal 337 for input to a node of port 344 as even crossing samples. Thus, for a sufficiently high data rate, a "late" crossing is selected for corresponding data. However, for a sufficiently low data rate, an "early" crossing is selected for corresponding data.

Figure 4:
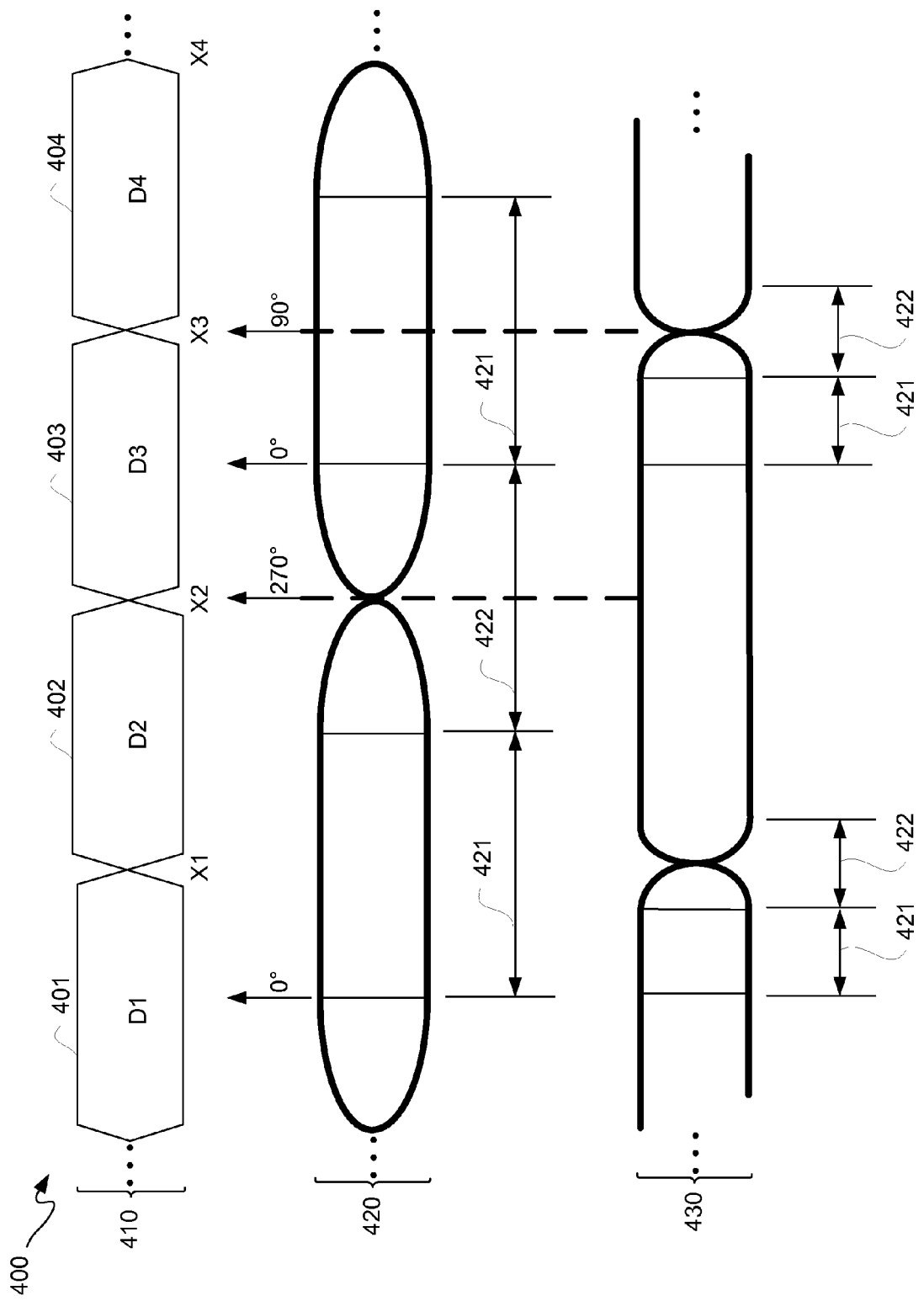
FIG. 4 is a signal diagram depicting exemplary signal timings for a data stream.

FIG. 4 is a signal diagram depicting exemplary signal timings 400 for a data stream 410. Signal timings 400 are further described with simultaneous reference to FIGS. 1-4.

Data stream 410 includes eyes 401 through 404 corresponding to data samples D1 through D4. Crossing samples X1 through X4 corresponding to eyes 401 through 404 are respectively one half a UI later than corresponding data samples D1 through D4. In this example, data stream 420 is for a high data rate, and data stream 430 is for a low data rate.

For an unrolled or speculative DFE 170, a first tap is not fed back to a summer but is provided to a multiplexer. Along those lines, a D2 sample does provide feedback to a D3 sample through such multiplexer in DFE 170, and thus a D2 sample provides not provide such feedback through a summer. Therefore, tightest timing is a D1 sample providing feedback to a D3 or D2 sample for providing feedback to a D4 sample, both of which is a 2 UI timing distance. For a D2 sample to provide feedback to a D3 sample in a DFE without unrolling, a 1 UI timing distance would be used, which is even a tighter timing for high speed applications. Accordingly, it shall be assumed that an unrolled DFE 170 is used.

Timing relationships of delay in a DFE 170 and settling time of analog summers thereof with respect to a UI are further described with reference to high data rate stream 420 and low data rate stream 430. For purposes of clarity by way of example and not limitation, some values are used. However, in other implementations these or other values may be used.

At high data rates, a sum of a delay through a DFE 170, generally a logic delay ("Tlogic") 421, and a summer settling time ("Tsum") 422 of such DFE 170 can be as large as 2 UIs. As long as Tlogic+Tsum is less than or equal to 2 UIs, timing and performance for high-speed applications may be met. However, if data rate is slowed to some extent, Tlogic and Tsum can be much smaller compared to a UI. If Tlogic+Tsum <1.5 UI., using left-hand (early) crossing samples may give better performance, since the correct feedback information is ready and steady before the next sample is sampled.

Accordingly, below a 1.5 UI delay a "swap" of even and odd crossing samples and an associated "swap" of phases, as previously described, may be used. This swap may be performed for data rates when Tlogic+Tsum<0.5 UI, because that is when feedback from a data sample, such as a D1 sample for example, comes back and changes summer output before an X1 sample is sampled hence causing such crossing sample to be changed.

In the example of FIG. 3, data and clock paths are not adversely impacted for high speed rates, as selection circuit block 180 is inserted after DFE. In other words, no additional delay is inserted into a DFE 170 path by addition of selection circuit block 180, and therefore feedback timing constraints do not change. Also, by swapping the relative location of D and X samples by swapping 90 and 270 degree phases of a clock signal and corresponding crossing samples, deserializer 130 may continue to have a correct alignment of D and X samples for a Clock and Data Recovery engine, such as CDR 140, to work properly.

For clock swapping that controls the lead-lag behavior of X samples, programmability of PIs 150 and/or clock dividers 153 may be used to adjust to data rate. For an FPGA or other integrated circuit device, there may be at least two PIs 150 in a half-rate receiver 100, where one PI 150 of such receiver may be used to clock to sample for D samples and another PI 150 of such receiver may be used to clock to sample for X samples.

Initial phases of PIs 150 for D samples and X samples may be aligned. However, these corresponding D and X samples may drift apart over time, such as for example to +90 degrees or −90 degrees apart, such that sampling phases for D and X Samples are ½ UI apart. At low data rates, clock signals 152 used to trigger slicers 200 out of PIs 150 can pass through clock dividers 153 of PI block 149. If clock signals 152 pass through clock dividers 153 before being used by slicers 200, initial states of clock dividers 153 can be programmed such that clocks signals used for D and X samples may be programmed to be +/−½ UI or +/−90 degree apart from one another for corresponding signals.

The order of bit streams from D samples and X samples may be realigned after DFE 170 filtering by FIR chains before being sent to deserializer 130, such as by selection circuit block 180 as previously described. Along those lines, a deserializer 130 may be configured with D and X sample order being fixed. For example, a D sample may be fixed to always lead a corresponding X sample by ½ UI or 90 degrees.

However, at sufficiently low data rates, effectively D samples lag corresponding X samples by ½ UI or −90 degrees. To avoid CDR 140 producing incorrect information, multiplexers 312, 314, 315, and 316 in effect multiplex between crossing clock signals to have opposite outputs, namely outputs 180 degrees apart from one another, as well as multiplex corresponding odd and even crossings to correspond with such swapped phases. In short, at a sufficiently high data rate, information may pass straight through select circuit block 180, and at a sufficiently low data rate, namely when a left-hand (early) crossing is selected, crossing information generated from even and odd groups, as well as corresponding phases thereof, may be swapped by multiplexers 312, 314, 315, and 316. Therefore, deserializer 130 may receive a correct bit order for both high and low data rates.

Figure 5:
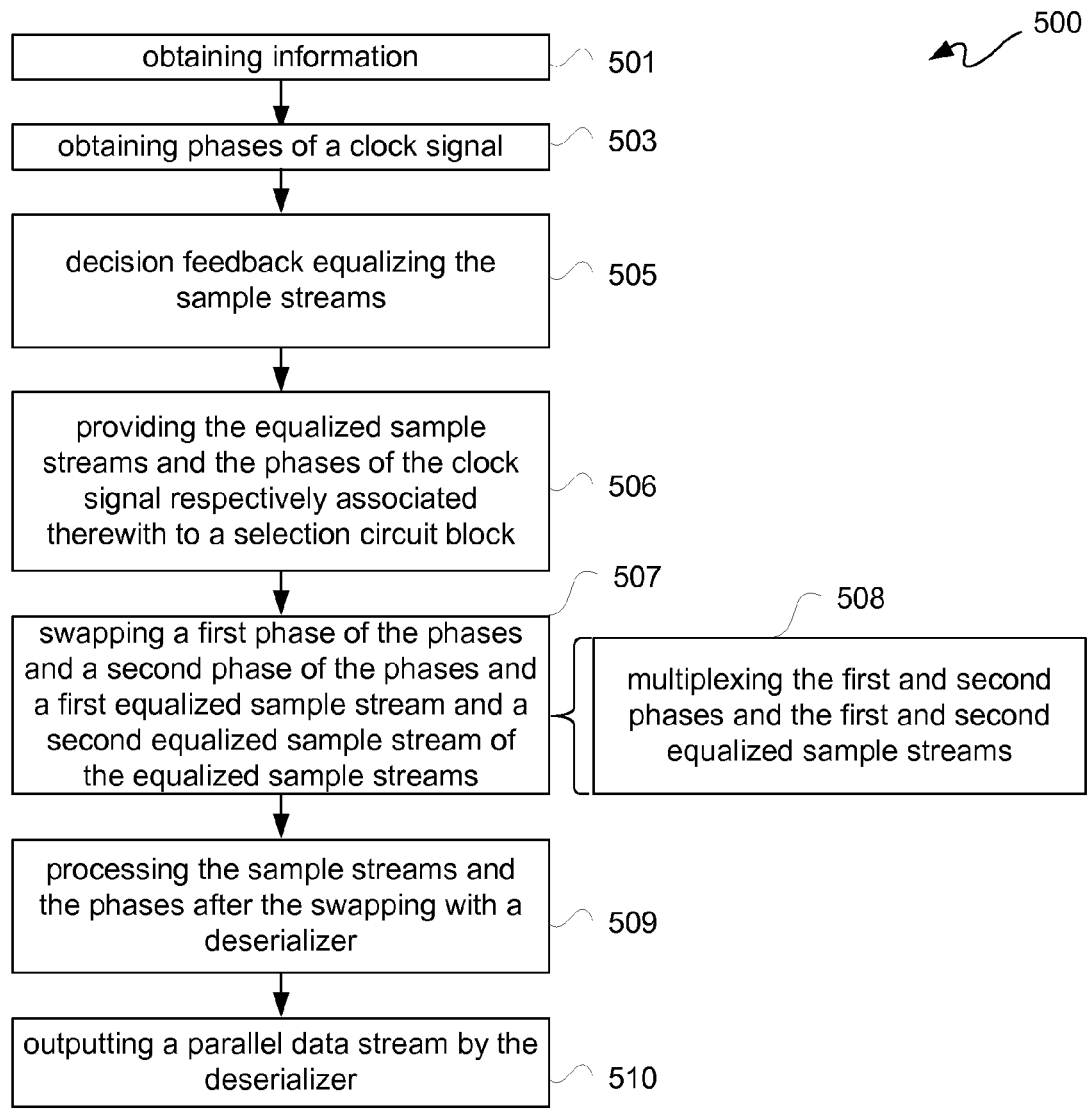
FIG. 5 is a flow diagram depicting an exemplary data reception process for data reception for any of a plurality of data rates.

FIG. 5 is a flow diagram depicting an exemplary data reception process 500 for data reception for any of a plurality of data rates. Such data rates may be high data rates, namely where a DFE/slicer delay is generally above 1.5 UI, and low data rates, namely where DFE/slicer delay is generally below 1.5 UI. Data reception process 500 is described further with simultaneous reference to FIGS. 1-5.

At 501, information may be received or obtained, such as for example receiving an analog data stream 111. At 503, clock signal phases 152, or phases of a clock signal, may be received, such as 0, 90, 180, and 270 degree phases 302, 304, 306, and 307, respectively.

At 505, such information may be decision feedback equalized by DFE 170, including sliced or sampled with a slicer or sampler 200 for D/A conversion of DFE 170, to generate or provide equalized sample streams. These equalized sample streams may include odd and even data sample streams and odd and even crossing sample streams 301, 305, 303, and 308, respectively. At 506, such equalized sample streams from 505 and such clock signal phases respectively associated therewith may be provided to a selection circuit block, such as selection circuit block 180.

At 507, a first phase and a second phase of such clock signal phases may be swapped or exchanged for with one another responsive to a data rate of such data rates being below or equal to a threshold. For a previously swapped state, such swapping may be a reverse swap responsive to another data rate being above such a threshold. Likewise, at 507, first and second equalized sample streams of such equalized sample streams may be swapped or exchanged, including reverse swapped, with one another responsive to data rate. Additionally, such swapping may not occur if a data rate continues to be either above or below (including equal) a threshold after changing data rates.

This operation at 507 may include at 508, a multiplexing such first and second phases and such first and second equalized sample streams. Along those lines, a 90 degree clock phase 304 as such first phase and a 270 degree clock phase 307 as such second phase, as previously described, may be multiplexed responsive to assertion of a control select signal 161. Likewise, odd crossing samples 303 and even crossing samples 308 for such first and second equalized streams, respectively, may be multiplexed corresponding to multiplexing of such first and second phases.

The effect of this swapping of phases causes a downstream swapping of phases in PI 149, namely downstream responsive to swapping by operations of control select signal 161. Because this downstream swapping of phases occurs in PI 149, there is no timing impact to DFE 170. Again, selection circuit block 180 adds circuitry, but such circuitry is after output 171 of DFE 170, and so such selection circuit block 180 is not in a DFE path to avoid negatively impacting delay through DFE 170.

This swapping of first and second phases may be for a data rate being below a threshold value. Again, this data rate threshold may vary from implementation to implementation depending on DFE/slicer feedback delay. Again, threshold value for a data rate may be for equalizing taking an amount of time which may be equivalent to approximately 1.5 UIs or less for a UI being an inverse of such a data rate.

A period of a clock signal 152 may be equal to approximately 1.5 UIs or less for low-speed operation responsive to a frequency of such clock signal. Again, sample streams may include even data samples, even crossings samples, odd data samples, and odd crossings samples respectively as such sample streams. Again, such clock signal phases or signals may include a 0 degree clock phase signal, a 90 degree clock phase signal, a 180 degree clock phase signal, and a 270 degree clock phase signal clock signal, and these signal phases may correspond to such odd data samples, such odd crossings samples, such even data samples, and such even crossings samples.

After 507, at 509 such sample streams and associated clock signal phase may be used or processed to convert such sample streams into a parallel data stream, and this processing may be performed with a deserializer 130, sometimes referred to as a serial-input, parallel-output converter ("SIPO"). Additionally, such deserializer 130 may process such sample streams to output data information 131 and crossing information 132 to CDR 140, along with outputting a parallel data stream 102 by deserializer 130, at 510.

Because one or more of the examples described herein may be implemented in an FPGA, a detailed description of such an IC is provided. However, it should be understood that other types of ICs (including non-programmable ICs, partially programmable ICs, and/or fully programmable ICs) may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 6:
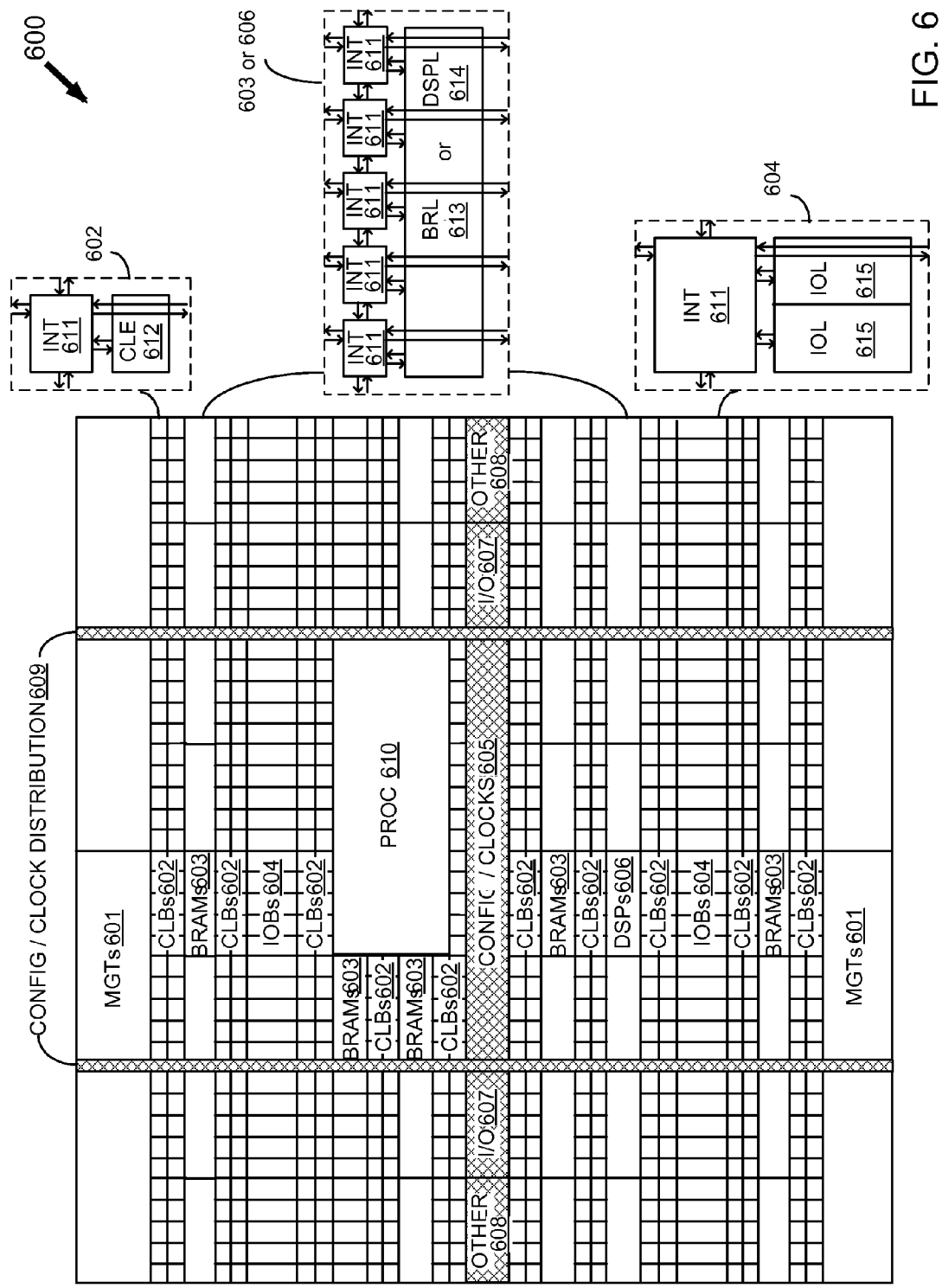
FIG. 6 is a simplified block diagram depicting an exemplary columnar Field Programmable Gate Array ("FPGA") architecture.

As noted above, advanced FPGAs can include several different types of programmable logic blocks in the array. For example, FIG. 6 illustrates an FPGA architecture 600 that includes a large number of different programmable tiles including multi-gigabit transceivers ("MGTs") 601, configurable logic blocks ("CLBs") 602, random access memory blocks ("BRAMs") 603, input/output blocks ("IOBs") 604, configuration and clocking logic ("CONFIG/CLOCKS") 605, digital signal processing blocks ("DSPs") 606, specialized input/output blocks ("I/O") 607 (e.g., configuration ports and clock ports), and other programmable logic 608 such as digital clock managers, analog-to-digital converters, system monitoring logic, and so forth. Some FPGAs also include dedicated processor blocks ("PROC") 610.

In some FPGAs, each programmable tile includes a programmable interconnect element ("INT") 611 having standardized connections to and from a corresponding interconnect element in each adjacent tile. Therefore, the programmable interconnect elements taken together implement the programmable interconnect structure for the illustrated FPGA. The programmable interconnect element 611 also includes the connections to and from the programmable logic element within the same tile, as shown by the examples included at the top of FIG. 6.

For example, a CLB 602 can include a configurable logic element ("CLE") 612 that can be programmed to implement user logic plus a single programmable interconnect element ("INT") 611. A BRAM 603 can include a BRAM logic element ("BRL") 613 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element ("DSPL") 614 in addition to an appropriate number of programmable interconnect elements. An IOB 604 can include, for example, two instances of an input/output logic element ("IOL") 615 in addition to one instance of the programmable interconnect element 611. As will be clear to those of skill in the art, the actual I/O pads connected, for example, to the I/O logic element 615 typically are not confined to the area of the input/output logic element 615.

In the pictured embodiment, a horizontal area near the center of the die (shown in FIG. 6) is used for configuration, clock, and other control logic. Vertical columns 609 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, processor block 610 spans several columns of CLBs and BRAMs.

Note that FIG. 6 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for data reception for any of a plurality of data rates, comprising:
 obtaining information by a decision feedback equalizer;
 obtaining phases of a clock signal by the decision feedback equalizer;

decision feedback equalizing the information using the phases of the clock signal with the decision feedback equalizer for providing equalized sample streams;

providing the equalized sample streams and the phases of the clock signal to a selection circuit block; and swapping a first and a second phase of the phases and a first and a second equalized sample stream of the equalized sample streams corresponding to the first phase and the second phase responsive to a data rate of the plurality of data rates.

2. The method according to claim 1, further comprising:

processing the equalized sample streams and the phases after the swapping with a deserializer; and outputting a parallel data stream by the deserializer.

3. The method according to claim 1, wherein the swapping is for the data rate being below a threshold value.

4. The method according to claim 3, wherein the data rate is for the threshold value being for the decision feedback equalizing taking approximately 1.5 unit intervals or less for a unit interval being an inverse of the data rate.

5. The method according to claim 4, wherein a period of the clock signal is the approximately 1.5 unit intervals or less for low-speed operation responsive to frequency of the clock signal.

6. The method according to claim 5, wherein:

the sample streams comprise even data samples, even crossings samples, odd data samples, and odd crossings samples respectively as the sample streams; and the phases include a 0 degree clock phase, a 90 degree clock phase, a 180 degree clock phase, and a 270 degree clock phase for the phases corresponding to the odd data samples, the odd crossings samples, the even data samples, and the even crossings samples.

7. The method according to claim 6, wherein the swapping comprises:

first multiplexing the odd crossing samples as the first equalized sample stream and the even crossing samples as the second equalized sample stream with a first multiplexer;

second multiplexing the even crossing samples and the odd crossing samples with a second multiplexer opposite the first multiplexing for providing different outputs from the first multiplexer and the second multiplexer;

third multiplexing the 90 degree clock phase as the first phase and the 270 degree clock phase as the second phase with a third multiplexer; and fourth multiplexing the 270 degree clock phase and the 90 degree clock phase with a fourth multiplexer opposite the third multiplexing for providing different outputs from the third multiplexer and the fourth multiplexer.

8. An apparatus for data reception at any of a plurality of data rates, comprising:

a selection circuit block coupled for obtaining equalized sample streams and associated clock signal phases;

the selection circuit block being coupled for swapping a first and a second phase of the clock signal phases and for swapping a first and a second equalized sample stream of the equalized sample streams corresponding to the first phase and the second phase responsive to a data rate of the plurality of data rates; and a decision feedback equalizer coupled for providing the equalized sample streams and the clock signal phases to the selection circuit block.

9. The apparatus according to claim 8, further comprising:

control circuitry being coupled for receiving the data rate and being coupled to the selection circuit block for causing the selection circuit block to:

swap the first phase and the second phase and the first equalized sample stream and the second equalized sample stream for the data rate being below a threshold value; and not swap or reverse swap the first phase and the second phase and the first equalized sample stream and the second equalized sample stream for the data rate being above the threshold value.

10. The apparatus according to claim 9, wherein the decision feedback equalizer is coupled for receiving an analog data stream for providing the sample streams therefrom as digital sample streams.

11. The apparatus according to claim 10, wherein the decision feedback equalizer comprises a data slicer and a crossing slicer.

12. The apparatus according to claim 11, wherein the decision feedback equalizer comprises a first summation block and a second summation block each coupled to receive the analog data stream to respectively provide an odd data stream and an even data stream to the data slicer and the crossing slicer.

13. The apparatus according to claim 11, wherein the selection circuit block is coupled for receiving:

even data samples, even crossings samples, odd data samples, and odd crossings samples respectively as the equalized sample streams; and a 0 degree clock phase, a 90 degree clock phase, a 180 degree clock phase, and a 270 degree clock phase for the clock signal phases corresponding to the odd data samples, the odd crossings samples, the even data samples, and the even crossings samples.

14. The apparatus according to claim 13, wherein the selection circuit block comprises:

a first multiplexer coupled for receiving the 90 degree clock phase as the first phase and the 270 degree clock phase as the second phase;

a second multiplexer coupled for receiving the 270 degree clock phase and the 90 degree clock phase;

a third multiplexer coupled for receiving the odd crossing samples as the first equalized sample stream and the even crossing samples as the second equalized sample stream;

a fourth multiplexer coupled for receiving the odd crossing samples and the even crossing samples;

the first multiplexer and the second multiplexer having first outputs different from one another; and the third multiplexer and the fourth multiplexer having second outputs different from one another.

15. A system for data reception at any of a plurality of data rates, comprising:

a decision feedback equalizer;

a selection circuit block coupled for receiving equalized sample streams from the decision feedback equalizer and coupled for receiving associated clock signal phases corresponding to the equalized sample streams;

the selection circuit block being coupled for swapping:

a first and a second phase of the clock signal phases responsive to a data rate of the plurality of data rates; and a first and a second equalized sample stream of the equalized sample streams corresponding to the first phase and the second phase responsive to the data rate of the plurality of data rates;

a serial-to-parallel converter coupled for receiving the equalized sample streams and the clock signal phases delayed from the selection circuit block to provide a digital parallel data steam; and a phase interpolator block coupled for providing the clock signal phases with the first phase and the second phase swapped to the decision feedback equalizer.

16. The system according to claim 15, further comprising a receiver front end block coupled for providing an analog data stream to the decision feedback equalizer and for providing the data rate.

17. The system according to claim 15, further comprising control circuitry coupled for receiving the data rate and coupled to the selection circuit block for causing the selection circuit block to:
- swap the first phase and the second phase and the first equalized sample stream and the second equalized sample stream for the data rate being below a threshold value; and
- not swap or reverse swap the first phase and the second phase and the first equalized sample stream and the second equalized sample stream for the data rate being above the threshold value.

18. The system according to claim 15, further comprising a clock data recovery block coupled for receiving data bits and crossing bits from the serial-to-parallel converter and coupled to the phase interpolator block to provide a data code and a crossing code responsive to the data bits and the crossing bits received.

19. The system according to claim 15, wherein the decision feedback equalizer comprises a data slicer and a crossing slicer.

20. The system according to claim 15, wherein the selection circuit block is coupled for receiving:
- even data samples, even crossings samples, odd data samples, and odd crossings samples respectively as the sample streams; and
- a 0 degree clock phase, a 90 degree clock phase, a 180 degree clock phase, and a 270 degree clock phase for the clock signal phases corresponding to the odd data samples, the odd crossings samples, the even data samples, and the even crossings samples.

\* \* \* \* \*